US012541749B2

(12) United States Patent
Wieker et al.

(10) Patent No.: US 12,541,749 B2
(45) Date of Patent: Feb. 3, 2026

(54) CONVERTING LIMITED USE TOKEN TO STORED CREDENTIAL

(71) Applicant: Capital One Services, LLC, McLean, VA (US)

(72) Inventors: Jeffrey Carlyle Wieker, Falls Church, VA (US); Jeffrey M. Samitt, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 243 days.

(21) Appl. No.: 17/822,983

(22) Filed: Aug. 29, 2022

(65) Prior Publication Data
US 2024/0070629 A1 Feb. 29, 2024

(51) Int. Cl.
*G06Q 20/10* (2012.01)
*G06Q 20/40* (2012.01)

(52) U.S. Cl.
CPC ......... *G06Q 20/102* (2013.01); *G06Q 20/405* (2013.01)

(58) Field of Classification Search
CPC .. G06Q 20/102; G06Q 20/405; G06Q 20/108; G06Q 20/24; G06Q 40/03; G06Q 20/385
See application file for complete search history.

(56) References Cited

U.S. PATENT DOCUMENTS

| 7,606,770 | B2* | 10/2009 | Pinnell | G06Q 20/28 |
| | | | | 705/40 |
| 8,682,802 | B1* | 3/2014 | Kannanari | G06Q 20/3274 |
| | | | | 705/64 |
| 10,909,525 | B1* | 2/2021 | Dhodapkar | G06Q 20/3278 |
| 2015/0220963 | A1* | 8/2015 | Priebatsch | G06Q 30/0238 |
| | | | | 705/14.38 |
| 2017/0039568 | A1* | 2/2017 | Tunnell | G06F 21/33 |
| 2017/0140347 | A1* | 5/2017 | Berman | G06Q 20/325 |
| 2023/0325820 | A1* | 10/2023 | Battula | G06Q 20/385 |
| | | | | 705/67 |
| 2023/0410080 | A1* | 12/2023 | Singh | G06Q 20/24 |

OTHER PUBLICATIONS

Williams, Geoff. "Services that Allow You to Buy Now, Pay Later." U.S. News and World Report; Jul. 7, 2022. (Year: 2022).*

* cited by examiner

*Primary Examiner* — Elda G Milef
(74) *Attorney, Agent, or Firm* — Harrity & Harrity, LLP

(57) ABSTRACT

In some implementations, a token system may generate a limited use token for use in a first transaction between a user and a transacting entity. The token system may store one or more rules to amortize a value associated with the first transaction over multiple installments. The token system may receive a second request to map the limited use token to an open-ended account associated with the user. The token system may map the limited use token to the open-ended account associated with the user based on the second request. The token system may receive information indicating that the limited use token was used in a second transaction between the user and the transacting entity. The token system may map the second transaction associated with the limited use token to the open-ended account mapped to the limited use token.

20 Claims, 5 Drawing Sheets

CONVERTING LIMITED USE TOKEN TO STORED CREDENTIAL

BACKGROUND

Electronic transactions include activities related to the sale or purchase of goods and/or services over computer-mediated networks, whether between businesses, households, individuals, governments, or other public or private organizations. For example, electronic transactions utilize technologies such as mobile commerce, electronic funds transfer, supply chain management, Internet marketing, online transaction processing, identity verification, electronic data interchange, inventory management systems, and automated data collection systems.

SUMMARY

Some implementations described herein relate to a system for increasing usage of a limited use token. The system may include one or more memories and one or more processors communicatively coupled to the one or more memories. The one or more processors may be configured to generate the limited use token for use in a first transaction between a user and a transacting entity. The one or more processors may be configured to store one or more rules to amortize a value associated with the first transaction over multiple installments based on information confirming that the limited use token was used to complete the first transaction. The one or more processors may be configured to map the limited use token to an open-ended account associated with the user based on a request received from a user device associated with the user. The one or more processors may be configured to receive information indicating that the limited use token was used in a second transaction between the user and the transacting entity. The one or more processors may be configured to map the second transaction associated with the limited use token to the open-ended account mapped to the limited use token.

Some implementations described herein relate to a method for reusing a limited use token. The method may include generating, by a token system, the limited use token for use in a first transaction between a user and a transacting entity based on a first request received from a user device associated with the user. The method may include storing, by the token system, one or more rules to amortize a value associated with the first transaction over multiple installments. The method may include receiving, by the token system, a second request to map the limited use token to an open-ended account associated with the user, where the second request is received during a session in which the user registers for or accesses the open-ended account. The method may include mapping, by the token system, the limited use token to the open-ended account associated with the user based on the second request. The method may include receiving, by the token system, information indicating that the limited use token was used in a second transaction between the user and the transacting entity. The method may include mapping, by the token system, the second transaction associated with the limited use token to the open-ended account mapped to the limited use token.

Some implementations described herein relate to a non-transitory computer-readable medium that stores a set of instructions for a token system. The set of instructions, when executed by one or more processors of the token system, may cause the token system to generate a limited use token for use in a first transaction between a user and a transacting entity based on an application program interface call received from a device associated with the transacting entity. The set of instructions, when executed by one or more processors of the token system, may cause the token system to store one or more rules to amortize a value associated with the first transaction over multiple installments based on information confirming that the limited use token was used to complete the first transaction. The set of instructions, when executed by one or more processors of the token system, may cause the token system to receive, from a user device associated with the user, a request to map the limited use token to an open-ended account associated with the user. The set of instructions, when executed by one or more processors of the token system, may cause the token system to map the limited use token to the open-ended account associated with the user based on the request received from the user device. The set of instructions, when executed by one or more processors of the token system, may cause the token system to receive information indicating that the limited use token was used in a second transaction between the user and the transacting entity. The set of instructions, when executed by one or more processors of the token system, may cause the token system to map the second transaction associated with the limited use token to the open-ended account mapped to the limited use token.

DETAILED DESCRIPTION

Figure 1A:
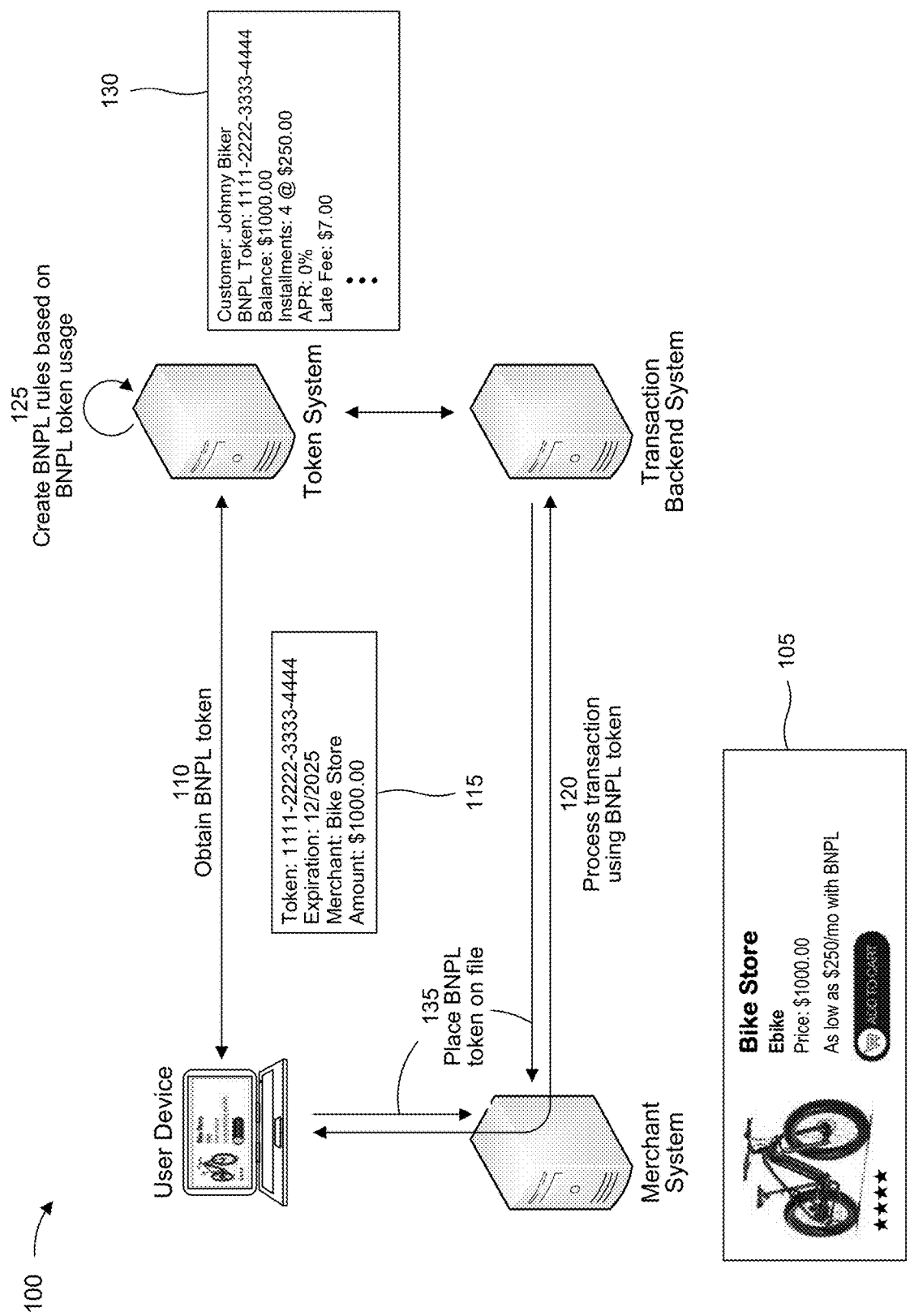
FIGS. 1A-1B are diagrams of an example implementation associated with converting a limited use token to a stored credential, in accordance with some embodiments of the present disclosure.

The following detailed description of example implementations refers to the accompanying drawings. The same reference numbers in different drawings may identify the same or similar elements.

Buy now, pay later (BNPL), sometimes referred to as a point-of-sale installment loan, is a short-term financing option that allows a consumer to pay for a purchase over time in multiple equal or roughly equal installments, often with no fees and zero or very little interest. BNPL payments are popular with consumers because BNPL payments offer a convenient and often interest-free mechanism to pay for a purchase, which may be especially useful for budgeting or otherwise spreading the cost for a large purchase over time, and offering BNPL at checkout can provide merchants with lower cart abandonment rates and higher average order values. For example, in a typical BNPL transaction, a BNPL service provider will communicate with a system (e.g., associated with a nationwide consumer reporting company (NCRC)) to perform a soft credit check or an identity verification on a consumer requesting BNPL financing, and the BNPL service provider may then electronically generate a limited use token (e.g., a transaction-specific one-time-use credential) that is issued to the consumer (e.g., sent to a device associated with the consumer) and valid only for a specific transaction associated with the BNPL financing option. After the purchase is complete, the consumer then pays periodic installments (e.g., by electronically accessing an account associated with the BNPL transaction), often with no fees or interest if the periodic installments are paid on-time and in-full.

However, from a technical perspective, BNPL financing is associated with various inefficiencies. For example, as described above, payment tokens that are used in BNPL transactions tend to be one-time-use transaction-specific payment credentials. Accordingly, each time that a consumer wants to enter into a new BNPL transaction, the consumer may need to use a user device to communicate with the BNPL service provider over a network to apply for BNPL financing, the BNPL service provider may need to communicate with other systems (e.g., an NCRC system) to perform a (soft or hard) credit check and/or perform identity verification, the BNPL service provider may need to use computer resources to create a new payment token or credential to be used in the transaction, the BNPL service provider may need to communicate with the user device and/or a merchant system to provide the new payment token or credential to be used in the transaction, and the BNPL service provider may need to create BNPL rules on payment systems to manage the installment payments. As a result, each time that a transaction is performed using BNPL financing, there may be significant overhead on various data, communication, and/or transaction processing networks and consumption of computing resources to process the BNPL application and set up the appropriate payment token, in addition to ongoing consumption of computing resources to manage the payment plan for each transaction subject to BNPL financing.

Furthermore, another challenge that may arise in BNPL transactions is fraud prevention. For example, BNPL fraud tends to target many of the same features that make BNPL financing popular with consumers, such as lenient authentication mechanisms that are meant to reduce friction for legitimate transactions (e.g., soft credit checks or no credit check). For example, BNPL service providers often have to make real-time credit decisions as soon as just prior to a consumer completing a transaction, which creates a light-weight process that fraudsters may exploit to make large purchases with little resistance (e.g., by acquiring a driver's license or other personal information through data breaches, forgery, or phishing and using the personal information to open a BNPL account and/or through synthetic identity fraud where real and false personal information is combined to create a new identity). In addition, because BNPL service providers allow users to spread purchase over multiple installments, bad actors may exploit the lengthy repayment period by hacking accounts to make unauthorized transactions, pay just a portion of the base value (e.g., 25% due at the time of the transaction), and skipping the remaining payments. Additionally, or alternatively, because BNPL transactions typically do not utilize the same standard (e.g., hard) credit checks and identity verification measures that are used to open credit card accounts and/or bank accounts, BNPL transactions are susceptible to fraud risks such as account takeovers, synthetic identity fraud, and never-pays.

In some implementations described herein, a limited use token (e.g., a transaction-specific payment token to be used in a transaction subject to BNPL financing) may be converted to stored credential information. For example, stored credential information (or card-on-file information) generally refers to information related to a payment method, such as a credit card number and/or associated information (e.g., an expiration date, security code, and/or billing address), that may be electronically stored by a merchant system such that the stored credential information may be saved and reused in future transactions. For example, in a consumer-initiated transaction, a consumer may provide a merchant with payment credentials in order to actively enter into a transaction (e.g., an in-person transaction at a point-of-sale and/or an online transaction at a merchant website). In some cases, the consumer may elect to store the payment credentials with the merchant to avoid having to communicate the payment credentials over potentially insecure networks when entering into subsequent consumer-initiated transactions and/or authorizing subsequent merchant-initiated transactions using the stored credentials, which may reduce a risk of exposing the payment credential in a data breach and/or a risk of the fraudulent activity using the payment credential.

Accordingly, as described herein, some implementations may map the limited use token that was generated for use in a specific transaction subject to BNPL financing to an open-ended account that may be associated with a verified identity and usable for future and ongoing spending (e.g., a revolving credit card account, a checking account, a savings account, or the like). For example, in some implementations, a user device may interact with a token system to establish a limited use token that is associated with a BNPL financing option, and the limited use token may be used to make a purchase through a merchant system. In some implementations, the user device or the token system may then instruct the merchant system to store the limited use token on-file as a stored credential to be used in subsequent transactions. In cases where a user of the user device subsequently accesses the token system to apply for a new open-ended account or access an existing open-ended account, the user may be presented with an option to remap the limited use token to the new or existing open-ended account. In cases where the user selects the option to remap the limited use token to the new or existing open-ended account, the token system may remap the limited use token to the open-ended account. In this way, subsequent transactions that are performed using the limited use token may be routed or otherwise mapped to the open-ended account. For example, in some implementations, the subsequent transactions may be charged to the open-ended account and/or may be subject to BNPL financing options that are managed via the open-ended account.

In this way, the user can continue to use the limited use token in additional transactions without having to communicate with the token system to apply for BNPL financing or a new limited use token each time that a purchase is made using the limited use token, which may reduce communication overhead on various networks (e.g., by avoiding a need for the token system to communicate with an NCRC system or other suitable systems to perform a credit check or identity verification for each purchase) and reduce resource consumption on various devices (e.g., by avoiding a need to generate many limited use tokens at the token system, avoiding a need to receive and store information related to each limited use token at the user device and/or the merchant system, and/or avoiding a need to create and manage separate BNPL payment plans for every BNPL transaction). Furthermore, because the open-ended account is associated with a verified identity (e.g., based on a hard credit check and other identity verification measures that are required to open a credit card account or a bank account), the limited use token may be less susceptible to BNPL fraud schemes such as account takeovers, synthetic identity fraud, and never-pays (e.g., by integrating identity verification and/or authentication techniques implemented via the open-ended account, such as biometric authentication, multi-factor authentication, or the like).

Figure 1B:
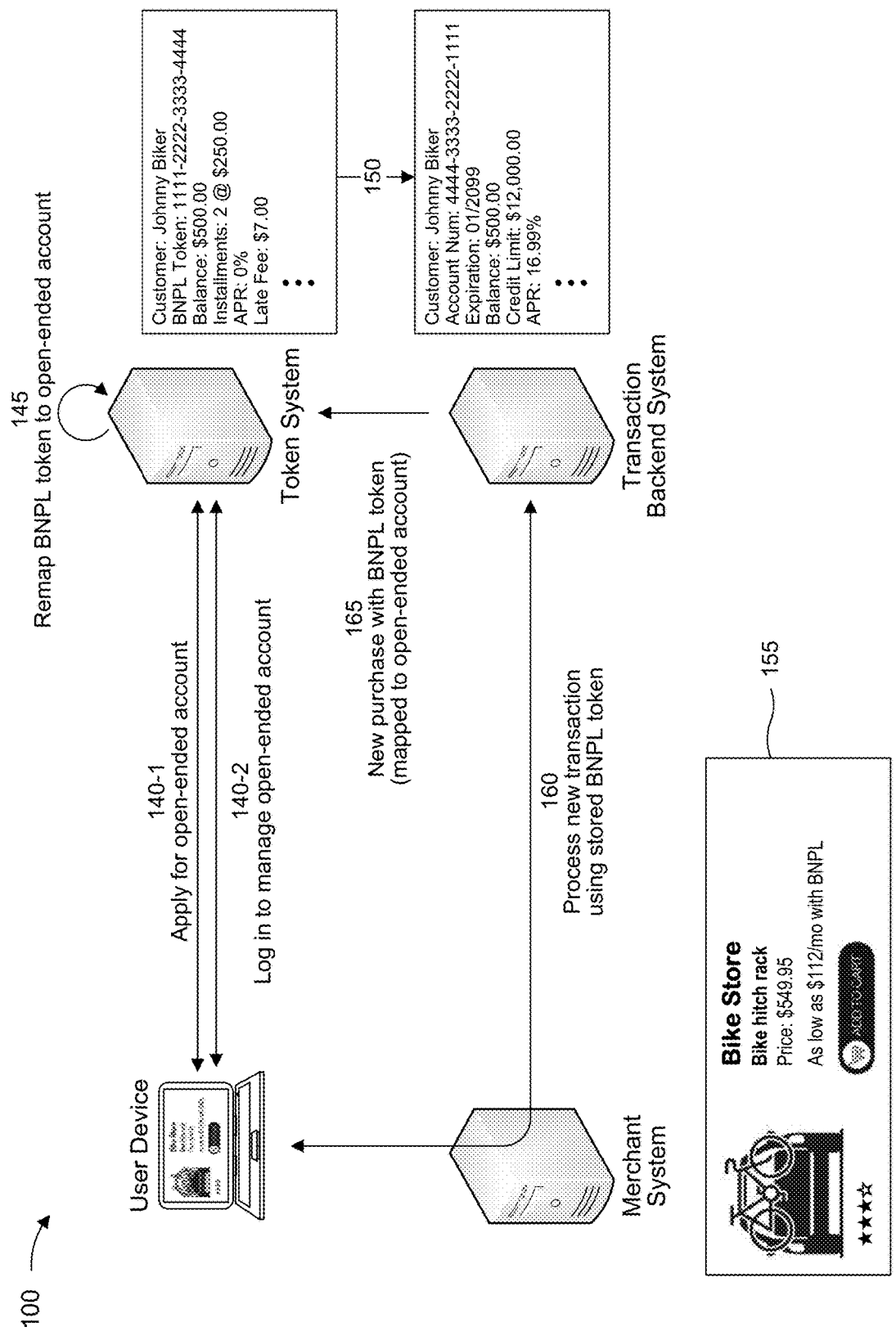

FIGS. 1A-1B are diagrams of an example 100 associated with converting a limited use token to a stored credential. As shown in FIGS. 1A-1B, example 100 includes a user device, a merchant system, a token system, and a transaction backend system. The user device, the merchant system, the token system, and the transaction backend system are described in more detail in connection with FIG. 2 and FIG. 3.

As shown in FIG. 1A, and by reference number 105, a user may visit a merchant and may identify one or more goods or services to be purchased. For example, in FIG. 1A, the user may access the merchant system (e.g., an electronic commerce website or server associated with a merchant) through the user device (e.g., via a web browser or a shopping application used to access the electronic commerce website or server associated with the merchant). Additionally, or alternatively, in some cases, the user may visit a physical store location associated with the merchant, in which case the merchant system depicted in FIGS. 1A-1B and described herein may be a point-of-sale terminal or other transaction terminal operated at the physical store location associated with the merchant. In either case, the user may identify one or more goods to be purchased, and may request or apply for BNPL financing to spread a cost of the purchase over multiple periodic installments (e.g., bi-weekly or monthly installments). For example, FIG. 1A depicts a use case where the user is shopping for an electronic bicycle (often referred to as an "ebike") that has a cost of $1000.00. Accordingly, rather than paying the full $1000.00 at the time of making the purchase (plus any tax or other costs, such as a maintenance plan), the user may elect to apply for BNPL financing that allows the purchase to be paid in smaller installments subject to BNPL financing terms, as described herein. In some implementations, the BNPL financing option may be integrated into the merchant system (e.g., offered at checkout, shown in FIG. 1A by an "As low as $250/mo with BNPL" option that may be presented via the user device or an in-store placard), in which case the merchant system may communicate with the token system (e.g., via application program interface (API) calls) to offer the BNPL financing to customers. Alternatively, in some implementations, the token system may offer BNPL financing directly to consumers, in which case the user of the user device may communicate with the token system directly (e.g., independent of the merchant system) to apply for BNPL financing.

As further shown in FIG. 1A, and by reference number 110, the user device may communicate with the token system to obtain a limited use token, which may be referred to herein as a BNPL token, a transaction-specific token, a one-time use credential, or the like. For example, in order to apply for BNPL financing, the token system may present a BNPL financing application or form to the user device, which may request information such as a name, an address, a telephone number, an email address, and a social security number (SSN) or individual taxpayer identification number (ITIN) associated with the user applying for the BNPL financing. In addition, the BNPL financing application may request information about the transaction being financed using the BNPL financing application, including the merchant where the user wishes to use the limited use token and the amount to be financed. Accordingly, the token system may use the information requested about the user to process the BNPL financing application, which may include performing an identity verification process and/or a soft or hard credit check. In cases where the BNPL financing application is approved, the requested transaction amount may be loaded onto a limited use credential that is valid only at the merchant associated with the BNPL financing application, up to the transaction amount that was requested at the time that the BNPL financing application was submitted to the token system. In some implementations, in cases where the BNPL financing application is approved, the token system may present the user device with one or more BNPL financing options (e.g., a number of installments, a periodicity of installments, an interest rate, which may be zero or relatively lower for BNPL loans that are repaid over a short time period compared to BNPL loans that are repaid over a longer time period, a late fee that may be charged for any late installment payments, or the like). Alternatively, the token system may offer fixed BNPL financing terms, such as a timeline, interest rate, and/or monthly fee that the user must accept to obtain the BNPL financing.

Accordingly, as shown by reference number 115, the token system may provide the limited use (e.g., transaction-specific BNPL) token to the user device based on approving the BNPL financing application submitted by the user of the user device and based on the user of the user device selecting or agreeing to BNPL financing terms. For example, in some implementations, the limited use token may be a virtual card number (VCN), which is a uniquely generated and anonymized credit card number (e.g., a sixteen-digit number) that is linked to an existing payment account (e.g., an account that the token system uses to transfer funds to a merchant that obtains an appropriate authorization using the VCN). For example, as described above, the limited use token may be a VCN or one-time-use, transaction-specific, token that is valid only at the merchant associated with the BNPL financing application, up to the transaction amount that was requested at the time that the BNPL financing application was submitted to the token system. Furthermore, in some implementations, the limited use token may be associated with other suitable information that enables the user to enter into a transaction using the limited use token (e.g., an expiration date and a security code that may be provided at checkout, like a standard credit card, along with billing information that matches the name and address that was provided to the token system in the application for BNPL financing). Additionally, or alternatively, in cases where the token system is integrated with the merchant system, the limited use token may be sent from the token system to the merchant system, in which case the limited use token may be a reference token, a unique string, or other suitable information that is substituted for an account number (e.g., such that the tokenized payment information cannot be used for fraudulent activity in the event of a data breach). Additionally, or alternatively, in some cases, the limited use token may be a network token associated with a payment processing network (e.g., VISA® or MASTERCARD®). In some implementations, the token system may configure the limited use token to expire after a certain time period if the limited use token is not used (e.g., 24 hours after creation, to prevent fraudulent activity).

As further shown in FIG. 1A, and by reference number 120, the limited use token may be used to process a transaction at the merchant system. For example, in some implementations, the token system may issue a physical transaction card to the user of the user device, where the physical transaction card may include information related to the limited use token. Accordingly, in an in-person shopping experience, the user may present the physical transaction card at checkout, and the merchant system may communicate with the transaction backend system to process the transaction in a similar manner as a standard credit card or debit card transaction (e.g., swiping the physical transaction card through a magnetic stripe reader, tapping the physical transaction card against a tap-to-pay reader, inserting the physical transaction card into a chip reader, or the like). Additionally, or alternatively, in an electronic commerce or online shopping context, the token system may electronically communicate information related to the limited use token to the user device, and the user may then use the user device to interact with the merchant system (e.g., via a web browser or shopping application) to enter the information associated with the limited use token at checkout in a similar manner as a standard credit card transaction (e.g., inputting the user's name and address in addition to the sixteen (or other number of) digits making up the limited use token, expiration date, and security code). Additionally, or alternatively, in cases where the token system is integrated with the merchant system (e.g., the merchant offers BNPL service at checkout through the token system), the token system may communicate information related to the limited use token directly to the merchant system (e.g., via an API call) without involving the user device (e.g., other than processing the application for BNPL financing, although the application could be submitted from the merchant system to the token system). Accordingly, in some implementations, the limited use token associated with the BNPL financing may be used to enter into a transaction with the merchant system in various ways, including an in-person transaction or an online transaction. Furthermore, as described herein, the limited use token may be provided to the user of the user device (e.g., electronically in the case of a digital token or via mail in the case of a physical card) in cases where the token system offers BNPL financing to consumers directly and/or to the merchant system in cases where the merchant offers BNPL financing to consumers using the token system as a third-party BNPL service provider.

As further shown in FIG. 1A, and by reference number 125, the token system may create one or more BNPL rules associated with the limited use token based on authorized usage of the limited use token in a transaction. For example, as described above, the limited use token may be associated with a specific merchant and a maximum amount (e.g., an amount that was input in the application for BNPL financing), and in some cases may be configured to expire if the limited use token is not used within a given time period (e.g., 24 hours from issuance). Accordingly, based on the transaction backend system authorizing the transaction requested by the merchant system (e.g., based on the merchant system being associated with the correct merchant and/or requesting authorization for the transaction before the limited use token has expired), the transaction backend system may authorize payment to the merchant system up to the amount that was approved for BNPL financing. For example, if the user requested approval for $1000.00 in BNPL financing for an ebike, the transaction backend system may approve the transaction if the requested transaction amount is less than or equal to $1000.00 (e.g., allowing for potential discounts or other variables that may result in the final transaction amount being less than $1000.00). Alternatively, if the requested transaction amount exceeds $1000.00 (or whatever amount was approved for BNPL financing), the transaction backend system may approve the transaction up to the maximum amount that was approved for BNPL financing and the user may be required to provide an additional payment method to cover the balance (e.g., if the user later decides to add a bike helmet, charging equipment, or other items to the purchase, which causes the total amount to exceed the $1000.00 amount approved for BNPL financing).

In some implementations, when the transaction is approved or otherwise processed by the transaction backed system, the transaction backend system may provide information to the token system indicating that the limited use token was used in the transaction between the user and the merchant. The token system may then create the BNPL rules associated with the limited use token, where the BNPL rules may generally define a payment plan for the user to repay the amount subject to BNPL financing. For example, in some implementations, the BNPL rules may generally include a quantity of installment payments (e.g., four, six, twelve, eighteen, or another number of installments) and an amount of each installment (e.g., which may be equal or roughly equal to amortize the financed amount over the quantity of installment payments, such as $250.00 per installment for a financed amount of $1000.00 to be repaid in four installments, as shown by reference number 130). In addition, the one or more BNPL rules may include a periodicity for the installments (e.g., weekly, biweekly, monthly, or the like), an interest rate associated with the financed amount (e.g., which may be zero, or a relatively low interest rate that accrues as long as there is a non-zero balance or is applied retroactively only if the user misses a payment), a service charge (e.g., which may be zero, a relatively low amount that is charged to the user, or a percentage of the transaction value that is charged to the merchant), and/or a late fee that may be charged to the user if the user fails to make one or more payments on time. In some implementations, the BNPL rules may also specify one or more payment types that are accepted for paying the installments (e.g., debit card payments or automated clearing house (ACH) payments may be allowed, and credit card payments may be disallowed to mitigate consumer risks associated with debt-on-debt transactions). Additionally, or alternatively, the BNPL rules may specify how to handle issues such as the user returning one or more products to the merchant, not receiving an order, and/or needing to cancel an order (e.g., how balance adjustments and/or refunds for overpayments are handled to reflect merchant refunds or other events that may impact the outstanding credit balance and/or unpaid accrued interest).

As further shown in FIG. 1A, and by reference number 135, the limited use token associated with the BNPL financing may be stored (or placed on-file) at the merchant system. For example, as described herein, the limited use token may be structured, formatted, or otherwise configured to have the same or similar properties as payment tokens that are used in typical electronic transactions. For example, in some implementations, the limited use token may be a VCN that the user or user device presents to the merchant system, a reference token or other tokenized information that is substituted for an account number and sent to the merchant system by the token system, or a network token associated with a payment network processing entity, among other examples. Accordingly, from a perspective of the merchant system, the limited use token may be processed in the same way that a typical credit card or other electronic payment method is processed, whereby the limited use token or information linked to or otherwise associated with the limited use token may be placed on-file at the merchant system as a stored credential. For example, a stored credential (or stored payment method) generally refers to customer information that a merchant stores to make future purchases more convenient, where the stored information may include account information, payment tokens, verification information, and/or other suitable information that can be used in a future merchant-initiated transaction (e.g., for recurring payments or automatic billing of subscription services) and/or a future customer-initiated transaction (e.g., to purchase a new product or service). In some implementations, the limited use token may be placed on-file as a stored credential at the merchant system by the user (e.g., via the user device) or by the token system (e.g., via an API call between the token system and the merchant system through the transaction backend system).

As shown in FIG. 1B, and by reference number 140-1, the user device may establish a session with the token system to apply for an open-ended account, such as a revolving credit card account or a bank account (e.g., a checking or savings account) that may be associated with a debit card. Additionally, or alternatively, as shown by reference number 140-2, the user device may establish a session with the token system to access an existing open-ended account. In either case, the open-ended account may generally allow ongoing charges or transactions to be made using a credit card, a debit card, or the like, and the token system may present the user device with an option to link or otherwise map the previously created limited use token to the open-ended account. For example, in some implementations, the token system may offer BNPL financing to consumers (e.g., directly and/or through participating merchants), and consumers may be permitted to apply for BNPL financing and obtain limited use tokens that are each associated with a respective installment plan regardless of whether the consumers own a credit card account, a bank account, or other open-ended account managed via the token system. In this regard, the token system may issue and manage limited use tokens (including the BNPL payment plans associated with the limited use tokens) independently from revolving credit card accounts or bank accounts. Accordingly, rather than constraining the limited use tokens associated with BNPL financing options to a one-time use and incurring computing overhead to create, issue, and manage a new token each time that a consumer wishes to make a new purchase at the same merchant, the token system may provide the user device with the option to map the limited use token to a new open-ended account or an existing open-ended account during the session in which the user device is used to apply for or access the open-ended account. Furthermore, the user may generally be required to perform an identity verification and/or authorize a hard credit check at the time of establishing the open-ended account, which may configured with one or more authentication schemes to enable access to the open-ended account. For example, in some implementations, the open-ended account may require the user to pass a biometric authentication or multi-factor authentication to access the account, which may reduce a risk that the limited use token linked to the open-ended account (or an identity associated with the limited use token) is used in a fraudulent scheme such as an account takeover, synthetic identity fraud, a never-pay, or the like.

As further shown in FIG. 1B, and by reference number 145, the token system may then remap the limited use token to the (new or existing) open-ended account based on the user of the user device selecting the option to map the limited use token to the open-ended account. For example, in FIG. 1B, reference number 150 depicts an example mapping in which the user (Johnny Biker) has opened or accessed an open-ended account, which may be a revolving credit card account associated with a credit card number or a bank account associated with a debit card number, and the limited use token that was previously used to enter into a BNPL transaction with the merchant system has been mapped to the open-ended account. Accordingly, as described herein, mapping the limited use token to the open-ended account may provide the user with the ability to use the limited use token that was previously stored on-file at the merchant system as a stored credential in one or more future transactions. In some implementations, when the token system maps the limited use token to the open-ended account, the token system may communicate with the merchant system where the limited use token is stored on-file to indicate information associated with the (linked) open-ended account. For example, in some implementations, the limited use token may be associated with a BNPL product name such as "Bank BNPL card" and the open-ended account may be associated with a different product name, such as "Bank Platinum card." In this example, when the merchant system initially stores the limited use token on-file, the information available from the transaction back-end system may indicate the BNPL product name, and the token system may subsequently communicate with the merchant system to change the name of the stored credential from "Bank BNPL card" to "Bank Platinum card" (or the like) after the limited use token has been remapped to the open-ended account. Furthermore, in some implementations, the token system may update one or more controls or authentication logic (e.g., on the transaction backend system or another suitable authentication system) to allow additional transactions to be made using the limited use token (e.g., eliminating any maximum transaction amount or expiration time).

For example, as further shown in FIG. 1B, and by reference number 155, the user may return to the merchant (e.g., to the physical store location, website, or shopping application of the merchant) and may desire to purchase a new product from the merchant (e.g., a bike hitch rack to attach to a vehicle and transport the previously purchased ebike). Accordingly, as shown by reference number 160, a new transaction may be requested by the merchant system and processed through the transaction backend using the limited use token that was previously used in the BNPL transaction and stored on-file at the merchant system. From the perspective of the merchant system, the limited use token stored on-file may be handled in the same manner as a typical stored credential, whereby authorized merchant-initiated transactions and/or requested customer-initiated transactions may be processed through the transaction back-end system using the limited use token stored on-file at the merchant system. Accordingly, as further shown by reference number 165, information related to the new transaction performed using the limited use token may be processed against the open-ended account mapped to the limited use token. For example, in cases where the open-ended account is a credit card account, the amount of the new transaction may be added to the outstanding balance of the credit card account. Alternatively, in cases where the open-ended account is a checking, savings, or other bank account, the amount of the new transaction may be deducted from the available balance of the bank account. In some implementations, the token system may further provide the user with an option to set up BNPL financing for the new transactions that are made with the limited use token. For example, the user may apply for BNPL financing for new transactions associated with the limited use token prior to or at the time of checking out for the new transactions, and the token system may configure an installment plan for the new transactions in a similar manner as described above. Additionally, or alternatively, the token system may provide the user with an option to retroactively set up BNPL financing for one or more transactions that are performed using the limited use token and/or the open-ended account mapped to the limited use token.

In this way, the user can continue to use the limited use token in additional transactions over time without the token system having to process a BNPL financing application or create, issue, or manage new limited use tokens each time that a transaction is processed at a particular merchant. In this way, communication overhead on various networks may be reduced (e.g., by avoiding a need to perform a credit check or identity verification for each purchase) and resource consumption may be reduced on various devices (e.g., by avoiding a need to generate many limited use tokens at the token system, avoiding a need to receive and store information related to each limited use token at the user device and/or the merchant system, and/or avoiding a need to create and manage separate BNPL payment plans for every BNPL transaction).

As indicated above, FIGS. 1A-1B are provided as an example. Other examples may differ from what is described with regard to FIGS. 1A-1B.

Figure 2:
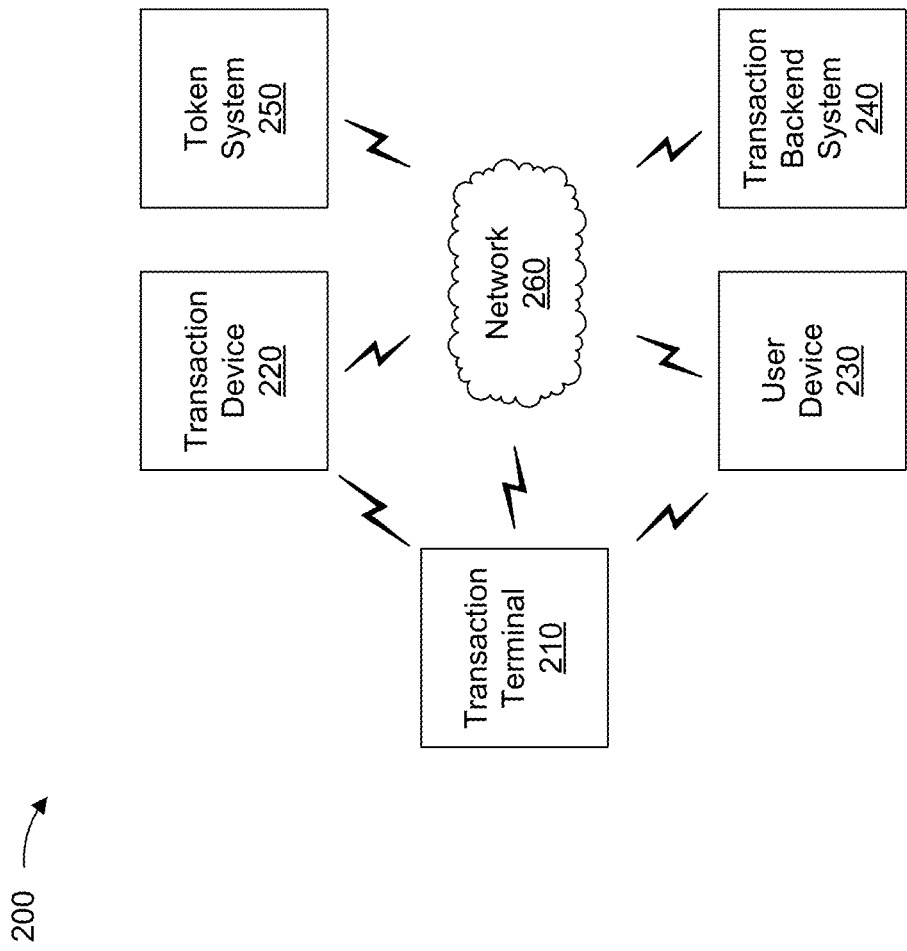
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a transaction terminal 210, a transaction device 220, a user device 230, a transaction backend system 240, a token system 250, and a network 260. Devices of environment 200 may interconnect via wired connections and/or wireless connections.

The transaction terminal 210 may include one or more devices capable of facilitating an electronic transaction associated with the transaction device 220. For example, the transaction terminal 210 may include a point-of-sale (PoS) terminal, a payment terminal (e.g., a credit card terminal, a contactless payment terminal, a mobile credit card reader, or a chip reader), an automated teller machine (ATM), and/or a server or computing device hosting an electronic commerce application, among other examples. The transaction terminal 210 may include one or more input components and/or one or more output components to facilitate obtaining data (e.g., account information) from the transaction device 220 and/or to facilitate interaction with and/or authorization from an owner or accountholder of the transaction device 220. Example input components of the transaction terminal 210 may include a number keypad, a touchscreen, a magnetic stripe reader, a chip reader, and/or a radio frequency (RF) signal reader (e.g., a near-field communication (NFC) reader). Example output devices of transaction terminal 210 may include a display and/or a speaker. Additionally, or alternatively, the transaction terminal 210 may include a communication interface to communicate over the network 260 in order to send and/or receive information to facilitate the electronic transaction associated with the transaction device 220.

The transaction device 220 may include one or more devices capable of being used for an electronic transaction. In some implementations, the transaction device 220 may include a transaction card (or another physical medium with integrated circuitry) capable of storing and communicating account information, such as a credit card, a debit card, a gift card, an ATM card, a transit card, a fare card, and/or an access card. In some implementations, the transaction device 220 may be the user device 230 or may be integrated into the user device 230. For example, the user device 230 may execute an electronic payment application capable of performing functions of the transaction device 220 described herein. Thus, one or more operations described herein as being performed by the transaction device 220 may be performed by a transaction card, the user device 230, or a combination thereof. For example, in some implementations, the user device 230 may execute the electronic payment application or another suitable application (e.g., a web browser) that can interact with an electronic commerce application hosted on the transaction terminal 210, and may communicate account information to the transaction terminal 210 (e.g., over the network 260) to facilitate an electronic transaction.

The transaction device 220 may store account information associated with the transaction device 220, which may be used in connection with an electronic transaction facilitated by the transaction terminal 210. The account information may include, for example, an account identifier that identifies an account (e.g., a bank account or a credit account) associated with the transaction device 220 (e.g., an account number, a card number, a bank routing number, and/or a bank identifier), a cardholder identifier (e.g., identifying a name of a person, business, or entity associated with the account or the transaction device 220), expiration information (e.g., identifying an expiration month and/or an expiration year associated with the transaction device 220), and/or a credential (e.g., a payment token). In some implementations, the transaction device 220 may store the account information in tamper-resistant memory of the transaction device 220, such as in a secure element. As part of performing an electronic transaction, the transaction device 220 may transmit the account information to the transaction terminal 210 using a communication component, such as a magnetic stripe, an integrated circuit (IC) chip (e.g., a EUROPAY®, MASTERCARD®, VISA® (EMV) chip), and/or a contactless communication component (e.g., an NFC component, an RF component, a Bluetooth component, and/or a Bluetooth Low Energy (BLE) component). Thus, the transaction device 220 and the transaction terminal 210 may communicate with one another by coming into contact with one another (e.g., using a magnetic stripe or an EMV chip), via contactless communication (e.g., using NFC), and/or via communication over the network 260 (e.g., over the Internet).

The user device 230 may include one or more devices capable of being used for an electronic transaction, as described above in connection with the transaction device 220. The user device 230 may include a communication device and/or a computing device. For example, the user device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. Additionally, or alternatively, the mobile device 230 may be capable of receiving, generating, storing, processing, and/or providing information associated with a limited use token (e.g., a transaction-specific BNPL token) that may be used in a first transaction and then converted to a stored credential (e.g., by remapping the transaction-specific BNPL token to an open-ended account, such as a bank account or a credit account) to enable reusing the limited use token in one or more subsequent transactions, as described elsewhere herein.

The transaction backend system 240 may include one or more devices capable of processing, authorizing, and/or facilitating a transaction. For example, the transaction backend system 240 may include one or more servers and/or computing hardware (e.g., in a cloud computing environment or separate from a cloud computing environment) configured to receive and/or store information associated with processing an electronic transaction. The transaction backend system 240 may process a transaction, such as to approve (e.g., permit, authorize, or the like) or decline (e.g., reject, deny, or the like) the transaction and/or to complete the transaction if the transaction is approved. The transaction backend system 240 may process the transaction based on information received from the transaction terminal 210, such as transaction data (e.g., information that identifies a transaction amount, a merchant, a time of a transaction, a location of the transaction, or the like), account information communicated to the transaction terminal 210 by the transaction device 220, and/or information stored by the transaction backend system 240 (e.g., for fraud detection).

The transaction backend system 240 may be associated with a financial institution (e.g., a bank, a lender, a credit card company, or a credit union) and/or may be associated with a transaction card association that authorizes a transaction and/or facilitates a transfer of funds. For example, the transaction backend system 240 may be associated with an issuing bank associated with the transaction device 220, an acquiring bank (or merchant bank) associated with the merchant and/or the transaction terminal 210, and/or a transaction card association (e.g., VISA® or MASTER-CARD®) associated with the transaction device 220. Based on receiving information associated with the transaction device 220 from the transaction terminal 210, one or more devices of the transaction backend system 240 may communicate to authorize a transaction and/or to transfer funds from an account associated with the transaction device 220 to an account of an entity (e.g., a merchant) associated with the transaction terminal 210.

The token system 250 may include one or more devices capable of receiving, generating, storing, processing, providing, and/or routing information associated with converting a limited use token (e.g., a transaction-specific BNPL token) into a stored credential that can be reused in subsequent transactions (e.g., by remapping the limited use token to an open-ended account, such as a revolving credit card account, a checking account, a savings account, or the like), as described elsewhere herein. The token system 250 may include a communication device and/or a computing device. For example, the token system 250 may include a server, such as an application server, a client server, a web server, a database server, a host server, a proxy server, a virtual server (e.g., executing on computing hardware), or a server in a cloud computing system. In some implementations, the token system 250 includes computing hardware used in a cloud computing environment. In some implementations, the token system 250 may be associated with the same financial institution as the transaction backend system 240.

The network 260 may include one or more wired and/or wireless networks. For example, the network 260 may include a cellular network, a public land mobile network, a local area network, a wide area network, a metropolitan area network, a telephone network, a private network, the Internet, and/or a combination of these or other types of networks. The network 260 enables communication among the devices of environment 200. In some implementations, the transaction terminal 210 may communicate with the transaction device 220 using a first network (e.g., a contactless network or by coming into contact with the transaction device 220) and may communicate with the transaction backend system 240 using a second network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
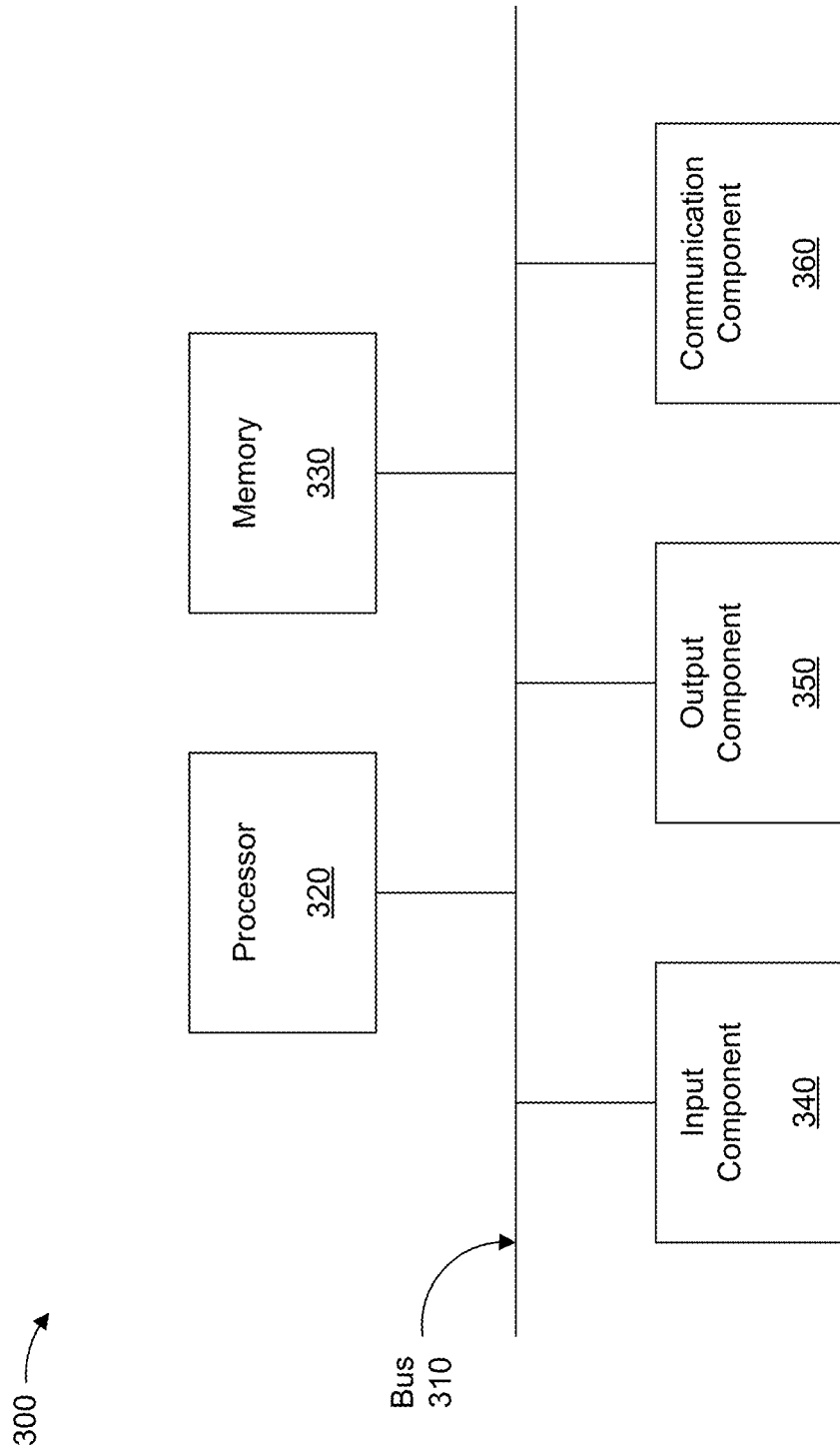
FIG. 3 is a diagram of example components of one or more devices of FIG. 2, in accordance with some embodiments of the present disclosure.

FIG. 3 is a diagram of example components of a device 300 associated with converting a limited use token to a stored credential. Device 300 may correspond to transaction terminal 210, transaction device 220, user device 230, transaction backend system 240, and/or token system 250. In some implementations, transaction terminal 210, transaction device 220, user device 230, transaction backend system 240, and/or token system 250 may include one or more devices 300 and/or one or more components of device 300. As shown in FIG. 3, device 300 may include a bus 310, a processor 320, a memory 330, an input component 340, an output component 350, and a communication component 360.

Bus 310 may include one or more components that enable wired and/or wireless communication among the components of device 300. Bus 310 may couple together two or more components of FIG. 3, such as via operative coupling, communicative coupling, electronic coupling, and/or electric coupling. Processor 320 may include a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 may include one or more processors capable of being programmed to perform one or more operations or processes described elsewhere herein.

Memory 330 may include volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 may include one or more memories that are coupled (e.g., communicatively coupled) to one or more processors (e.g., processor 320), such as via bus 310. Communicative coupling between a processor 320 and a memory 330 may enable the processor 320 to read and/or process information stored in the memory 330 and/or to store information in the memory 330.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
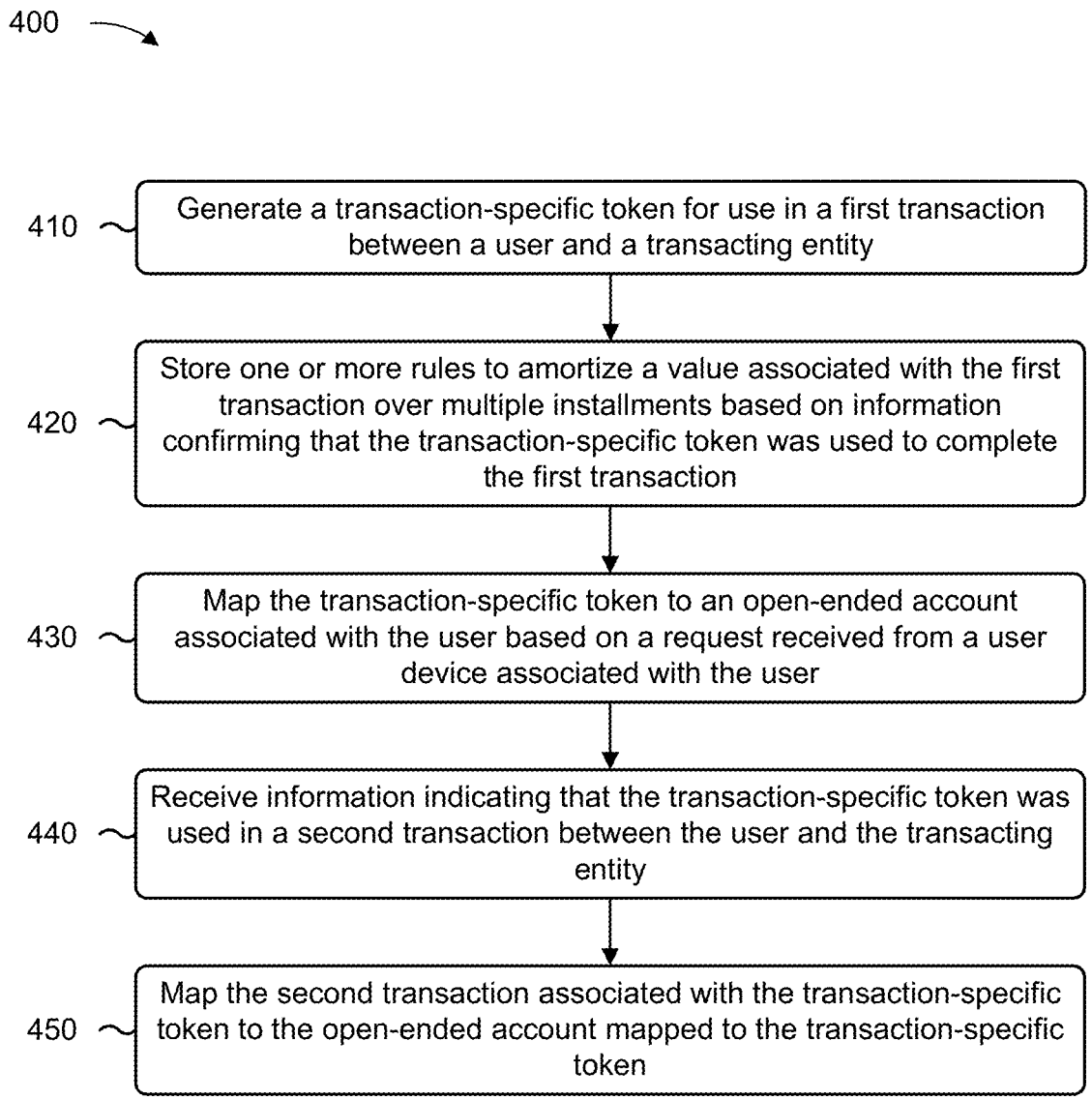
FIG. 4 is a flowchart of an example process associated with converting a limited use token to a stored credential, in accordance with some embodiments of the present disclosure.

FIG. 4 is a flowchart of an example process 400 associated with converting a limited use token to a stored credential. In some implementations, one or more process blocks of FIG. 4 may be performed by the token system 250. In some implementations, one or more process blocks of FIG. 4 may be performed by another device or a group of devices separate from or including the token system 250, such as the transaction terminal 210, the transaction device 220, the user device 230, and/or the transaction backend system 240. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include generating the limited use token for use in a first transaction between a user and a transacting entity (block 410). For example, the token system 250 (e.g., using processor 320 and/or memory 330) may generate the limited use token for use in a first transaction between a user and a transacting entity, as described above in connection with reference numbers 105, 110, 115, and 120 of FIG. 1A. As an example, a user may visit a merchant (e.g., a physical store location or a website associated with the merchant) and may decide to use a BNPL financing option when entering into a transaction with the merchant. For example, the user may use a user device to communicate with the token system (e.g., via a merchant system or independent from the merchant system) to request BNPL financing for the transaction. In some implementations, the token system may then generate a limited use token that the user can use to enter into the transaction with the merchant.

As further shown in FIG. 4, process 400 may include storing one or more rules to amortize a value associated with the first transaction over multiple installments based on information confirming that the limited use token was used to complete the first transaction (block 420). For example, the token system 250 (e.g., using processor 320 and/or memory 330) may store one or more rules to amortize a value associated with the first transaction over multiple installments based on information confirming that the limited use token was used to complete the first transaction, as described above in connection with reference numbers 120, 125, and 130 of FIG. 1A. As an example, the limited use token may be associated with a BNPL financing option that divides a value of the transaction into multiple equal or roughly equal installments, whereby the one or more rules may include the number of installments and the amount(s) per installment. In some cases, the BNPL financing option may be associated with other terms, such as an interest rate, a transaction fee, a late payment fee, or the like, which may be included among the rules for amortizing the value of the transaction.

As further shown in FIG. 4, process 400 may include mapping the limited use token to an open-ended account associated with the user based on a request received from a user device associated with the user (block 430). For example, the token system 250 (e.g., using processor 320 and/or memory 330) may map the limited use token to an open-ended account associated with the user based on a request received from a user device associated with the user, as described above in connection with reference numbers, 140-1, 140-2, 145, and 150 of FIG. 1B. As an example, the user may use the user device to interact with the token system to apply for a new open-ended account or access an existing open-ended account, which may include a credit card account, a bank account, a savings account, or any other account that can be used for different transactions over time. In this example, the user may request, via the user device, that the previously generated limited use token be remapped to the open-ended account, which may allow the limited use token to be used again in one or more subsequent transactions.

As further shown in FIG. 4, process 400 may include receiving information indicating that the limited use token was used in a second transaction between the user and the transacting entity (block 440). For example, the token system 250 (e.g., using processor 320, memory 330, input component 340, and/or communication component 360) may receive information indicating that the limited use token was used in a second transaction between the user and the transacting entity, as described above in connection with reference numbers 155, 160, and 165 of FIG. 1B. As an example, the limited use token that was used in the first transaction between the user and the merchant may be stored on-file with the merchant (e.g., as a stored credential that can be reused in subsequent transactions), whereby the user may interact with the merchant system (e.g., via the user device) to make one or more additional purchases using the limited use token stored on-file with the merchant. Accordingly, when the additional transactions are processed (e.g., approved) by the transaction backend system, the token system may receive information from the transaction backend system indicating that the limited use token was used to make the new purchase(s) via the merchant system.

As further shown in FIG. 4, process 400 may include mapping the second transaction associated with the limited use token to the open-ended account mapped to the limited use token (block 450). For example, the token system 250 (e.g., using processor 320 and/or memory 330) may map the second transaction associated with the limited use token to the open-ended account mapped to the limited use token, as described above in connection with reference numbers 150 and 165 of FIG. 1B. As an example, when the token system receives information from the transaction backend system indicating that the limited use token was used to make the new purchase(s), the token system may reference the mapping to the open-ended account and charge the new purchase(s) to the open-ended account. Additionally, or alternatively, the new purchase(s) may be associated with BNPL rules that allow the user to pay the purchase amount(s) in multiple installments with zero interest or an interest rate that satisfies a threshold (e.g., no more than 3%) and/or subject to any other BNPL payment plan terms.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1B. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for increasing usage of a limited use token, the system comprising:
 one or more memories; and
 one or more processors, communicatively coupled to the one or more memories, configured to:
  map the limited use token for use in a first transaction between a user and a transacting entity,
   wherein the limited use token is a transaction-specific one-time-use credential associated with buy now pay later (BNPL) rules used with a merchant system associated with the transacting entity;
  store one or more rules to amortize a value associated with the first transaction over multiple installments based on information confirming that the limited use token was used to complete the first transaction;
  remap the limited use token to an open-ended account associated with the user based on a request received from a user device associated with the user,
   wherein the remapping changes the limited use token from a single transaction-specific token to a token that can be reused in one or more subsequent transactions,
   wherein the one or more subsequent transactions are unrelated to the first transaction, and
   wherein the remapping causes authentication logic to be updated on a transaction backend system to allow additional transactions to be made using the limited use token between the user device and the merchant system via the transaction backend system, and
   wherein the remapping occurs during a session in which the user device is used to apply for or access the open-ended account instead of using the BNPL rules;
  receive information indicating that the limited use token was used in a second transaction, of the one or more subsequent transactions, between the user and the transacting entity; and map the second transaction associated with the limited use token to the open-ended account mapped to the limited use token.

2. The system of claim 1, wherein the one or more processors are further configured to:
send, to a device associated with the transacting entity via an application program interface, information to store the limited use token for use in the one or more subsequent transactions between the user and the transacting entity.

3. The system of claim 1, wherein the one or more processors are further configured to:
send, to a device associated with the transacting entity, information associated with the open-ended account to be associated with the limited use token.

4. The system of claim 1, wherein the one or more processors are further configured to:
receive the request to remap the limited use token to the open-ended account associated with the user during a session in which the user registers for the open-ended account,
wherein the user registers for the open-ended account by passing one or more of:
a biometric authentication, or
a multi-factor authentication.

5. The system of claim 1, wherein the one or more processors are further configured to:
receive the request to remap the limited use token to the open-ended account associated with the user during a session in which the user accesses the open-ended account.

6. The system of claim 1, wherein the one or more rules include one or more of a quantity of the multiple installments, an amount associated with each of the multiple installments, a periodicity of the multiple installments, an interest rate associated with the value to be amortized over the multiple installments, a service charge included in the value to be amortized over the multiple installments, or a late fee to be added to the value to be amortized based on a failure to make a timely payment for one or more of the multiple installments.

7. The system of claim 1, wherein the limited use token is generated based on a request received from a user device associated with the user.

8. The system of claim 1, wherein the limited use token is generated based on an application program interface call from a device associated with the transacting entity.

9. The system of claim 1, wherein the limited use token is a virtual card number, or a network token associated with a transaction processing network.

10. The system of claim 1, wherein the limited use token for use in the first transaction is valid only up to a transaction amount that was requested at a time that the first transaction was submitted to a token system.

11. A method for reusing a limited use token, comprising:
mapping, by a token system, the limited use token for use in a first transaction between a user and a transacting entity based on a first request received from a user device associated with the user,
wherein the limited use token is a transaction-specific one-time-use credential associated with buy now pay later (BNPL) rules used with a merchant system associated with the transacting entity;
storing, by the token system, one or more rules to amortize a value associated with the first transaction over multiple installments;
receiving, by the token system, a second request to map the limited use token to an open-ended account associated with the user,
wherein the second request is received during a session in which the user registers for or accesses the open-ended account;
remapping, by the token system, the limited use token to the open-ended account associated with the user based on the second request,
wherein the remapping changes the limited use token from a single transaction-specific token to a token that can be reused in one or more subsequent transactions,
wherein the one or more subsequent transactions are unrelated to the first transaction, and wherein the remapping causes authentication logic to be updated on a transaction backend system to allow additional transactions to be made using the limited use token between the user device and the merchant system via the transaction backend system, and
wherein the remapping occurs during a session in which the user device is used to apply for or access the open-ended account instead of using the BNPL rules;
receiving, by the token system, information indicating that the limited use token was used in a second transaction, of the one or more subsequent transactions, between the user and the transacting entity; and
mapping, by the token system, the second transaction associated with the limited use token to the open-ended account mapped to the limited use token.

12. The method of claim 11, wherein the one or more rules include one or more of a quantity of the multiple installments, an amount associated with each of the multiple installments, a periodicity of the multiple installments, an interest rate associated with the value to be amortized over the multiple installments, a service charge included in the value to be amortized over the multiple installments, or a late fee to be added to the value to be amortized based on a failure to make a timely payment for one or more of the multiple installments.

13. The method of claim 11, wherein the limited use token is a virtual card number, or a network token associated with a transaction processing network.

14. The method of claim 11, wherein the limited use token is configured to expire after a certain time period if the limited use token is not used.

15. A non-transitory computer-readable medium storing a set of instructions, the set of instructions comprising:
one or more instructions that, when executed by one or more processors of a token system, cause the token system to:
map a limited use token for use in a first transaction between a user and a transacting entity based on an application program interface call received from a device associated with the transacting entity,
wherein the limited use token is a transaction-specific one-time-use credential associate with buy now pay later (BNPL) rules used with a merchant system associated with the transacting entity;
store one or more rules to amortize a value associated with the first transaction over multiple installments based on information confirming that the limited use token was used to complete the first transaction;

receive, from a user device associated with the user, a request to remap the limited use token to an open-ended account associated with the user;

remap the limited use token to the open-ended account associated with the user based on the request received from the user device,
- wherein the remapping changes the limited use token from a single transaction-specific token to a token that can be reused in one or more subsequent transactions,
  - wherein the one or more subsequent transactions are unrelated to the first transaction, and wherein the remapping causes authentication logic to be updated on a transaction backend system to allow additional transactions to be made using the limited use token between the user device and the merchant system via the transaction backend system, and
- wherein the remapping occurs during a session in which the user device is to access the open-ended account instead of using the BNPL rules;

receive information indicating that the limited use token was used in a second transaction, of the one or more subsequent transactions, between the user and the transacting entity; and map the second transaction associated with the limited use token to the open-ended account mapped to the limited use token.

16. The non-transitory computer-readable medium of claim 15, wherein the one or more instructions further cause the token system to:
send, to the device associated with the transacting entity, information to store the limited use token for use in one or more subsequent transactions between the user and the transacting entity.

17. The non-transitory computer-readable medium of claim 15, wherein the one or more instructions further cause the token system to:
send, to the device associated with the transacting entity, information associated with the open-ended account to be associated with the limited use token.

18. The non-transitory computer-readable medium of claim 15, wherein the request to remap the limited use token to the open-ended account is received during a session in which the user registers for or accesses the open-ended account.

19. The non-transitory computer-readable medium of claim 15, wherein the one or more rules include one or more of a quantity of the multiple installments, an amount associated with each of the multiple installments, a periodicity of the multiple installments, an interest rate associated with the value to be amortized over the multiple installments, a service charge included in the value to be amortized over the multiple installments, or a late fee to be added to the value to be amortized based on a failure to make a timely payment for one or more of the multiple installments.

20. The non-transitory computer-readable medium of claim 15, wherein an identity check is performed when establishing the open-ended account.

\* \* \* \* \*